(12) United States Patent
Beal

(10) Patent No.: US 9,546,594 B2
(45) Date of Patent: Jan. 17, 2017

(54) CONTROL OF CHAMBER COMBUSTION AND OPERATION OF A GUIDED-VANE ROTARY INTERNAL COMBUSTION ENGINE

(71) Applicant: Arnold J. Beal, Knoxville, TN (US)

(72) Inventor: Arnold J. Beal, Knoxville, TN (US)

(73) Assignee: BRM Technologies, Inc., Knoxville, TN (US)

( * ) Notice: Subject to any disclaimer, the term of this patent is extended or adjusted under 35 U.S.C. 154(b) by 415 days.

(21) Appl. No.: 13/815,642

(22) Filed: Mar. 13, 2013

(65) Prior Publication Data

US 2014/0261295 A1    Sep. 18, 2014

(51) Int. Cl.

| F02B 53/10 | (2006.01) |
|---|---|
| F01C 21/08 | (2006.01) |
| F01C 21/10 | (2006.01) |
| F02B 53/12 | (2006.01) |
| F01C 1/344 | (2006.01) |

(52) U.S. Cl.
CPC ............. *F02B 53/12* (2013.01); *F01C 1/3446* (2013.01); *F01C 21/0827* (2013.01); *F02B 53/10* (2013.01); *F01C 21/108* (2013.01); *Y02T 10/17* (2013.01)

(58) Field of Classification Search
USPC .... 123/241, 235, 242, 243; 418/91–92, 106, 418/264, 61.1
See application file for complete search history.

(56) References Cited

U.S. PATENT DOCUMENTS

| 3,250,260 | A | | 5/1966 | Heydrich |
|---|---|---|---|---|
| 3,348,494 | A | | 10/1967 | Fischer |
| 3,450,108 | A | | 6/1969 | Rich |
| 3,640,648 | A | | 2/1972 | Odawara |
| 3,727,589 | A | | 4/1973 | Scott |
| 3,769,944 | A | * | 11/1973 | Raymond ..................... 123/235 |
| 3,863,611 | A | | 2/1975 | Bakos |
| 3,904,327 | A | | 9/1975 | Edwards et al. |
| 3,988,083 | A | | 10/1976 | Shimizu et al. |
| 4,079,083 | A | * | 3/1978 | Sarich ......................... 418/61.1 |
| 4,212,602 | A | | 7/1980 | Buran et al. |
| 4,859,163 | A | | 8/1989 | Schuller |
| 4,915,071 | A | * | 4/1990 | Hansen ......................... 123/242 |
| 4,998,868 | A | | 3/1991 | Sakamaki et al. |
| 5,030,074 | A | | 7/1991 | Sakamaki et al. |
| 5,277,158 | A | | 1/1994 | Pangman |
| 5,634,783 | A | | 6/1997 | Beal |
| 6,244,240 | B1 | * | 6/2001 | Mallen ......................... 123/243 |

(Continued)

Primary Examiner — Kenneth Bomberg
Assistant Examiner — Paul Thiede
(74) Attorney, Agent, or Firm — Michael E. McKee

(57) ABSTRACT

A guided-vane rotary internal combustion engine including a plurality of working chambers which are separated from one another by way of vane assemblies which rotate with a rotor assembly about an axis employs a rotor assembly having a plurality of sectors wherein each sector is associated with a corresponding working chamber and a plurality of spark plugs wherein each spark plug is mounted within a corresponding sector for igniting an air/fuel mixture contained within a corresponding working chamber. A rotor disk is mounted upon the rotor assembly for rotation therewith and acts as a distributor through which energizing charges are conducted to the spark plugs. In addition, a controller is utilized for selectively activating or de-activating the working chambers of the engine upon the occurrence of a predetermined event.

11 Claims, 9 Drawing Sheets

(56) References Cited

U.S. PATENT DOCUMENTS

| | | | | |
|---|---|---|---|---|
| 6,273,208 B1* | 8/2001 | Sand | ........................ | B60K 5/12 |
| | | | | 180/299 |
| 6,273,694 B1* | 8/2001 | Vading | .................... | F01C 1/352 |
| | | | | 418/13 |
| 6,640,543 B1* | 11/2003 | Seal | ........................ | F02B 41/00 |
| | | | | 123/198 F |
| 2004/0177837 A1* | 9/2004 | Bryant | ................ | F02B 29/0418 |
| | | | | 123/559.1 |
| 2007/0240674 A1* | 10/2007 | Peitzke | .................... | F01C 1/44 |
| | | | | 123/241 |
| 2008/0216792 A1* | 9/2008 | Hartfield | ............... | F01C 1/3441 |
| | | | | 123/213 |
| 2009/0301436 A1* | 12/2009 | Blunt | ..................... | F01B 13/06 |
| | | | | 123/44 R |

* cited by examiner

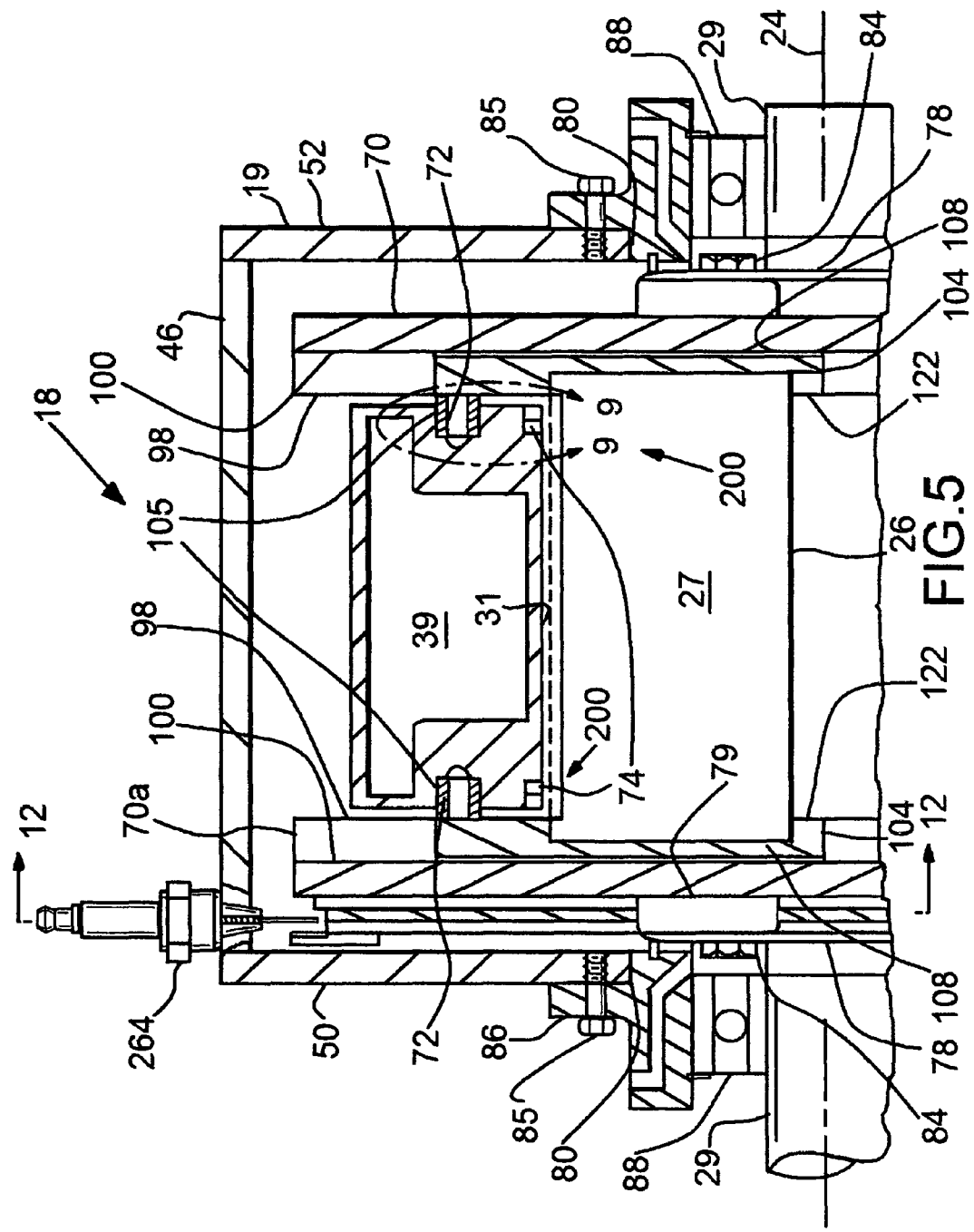

CONTROL OF CHAMBER COMBUSTION AND OPERATION OF A GUIDED-VANE ROTARY INTERNAL COMBUSTION ENGINE

BACKGROUND OF THE INVENTION

This invention relates generally to guided-vane rotary apparatus utilized as an internal combustion engine and relates, more particularly, to means and methods for igniting the air/fuel mixture within and for controlling the operation of the working chambers of the apparatus.

Guided-vane rotary apparatus with which this invention is concerned include a rotor which rotates within the interior of a housing and vanes which are associated with the rotor and housing for dividing the housing interior into working chambers. Commonly, the vanes are mounted within the rotor and adapted to slide relative thereto between alternative radial positions as the rotor is rotated within the housing. When employed as an internal combustion engine, the engine operates on the same four-cycle Otto thermodynamic principle common to a piston engine, but the thermodynamic operation of the guided-vane rotary engine is referred to as cycles, rather than strokes, as the guided-vane rotary engine has no pistons utilizing reciprocating strokes. Furthermore, the engine completes its four cycles of operation in one full revolution, i.e. 360 degrees, of the rotor output shaft. An example of a guided-vane rotary apparatus of the aforedescribed class is shown and described in U.S. Pat. No. 5,634,783, having the same inventor as the instant application.

In order to enhance the efficiency of a guided-vane rotary apparatus of the aforedescribed class, it would be desirable that the working chambers of the apparatus be effectively sealed from one another to prevent a leakage or flow of the working gases or fluid contained in one chamber of the apparatus to another chamber of the apparatus. In other words, when such leakage is permitted, any pumping efficiency or effectiveness of the apparatus as a positive displacement machine is impaired. However, current designs have not proven to be entirely satisfactory in this respect, and when the designs of such guided-vane rotary apparatus have involved a spark plug mounted within an outer wall of the housing interior, some degree of flow communication is commonly permitted between adjacent chambers of the apparatus as each vane of the apparatus moves past the spark plug.

Furthermore and for purposes of conserving fuel being utilized by such a guided-vane rotary engine or reducing the exhaust emissions of the engine, it would be desirable to provide a scheme of engine operation whereby all of the working chambers of the engine are utilized only when full operating power of the engine is desired, and less-than-all of the chambers are utilized when less-than-all of the operating power of the engine is desired.

Accordingly, it is an object of the present invention to provide a new and improved guided-vane rotary internal combustion engine whose structure reduces the likelihood of flow communication between working chambers of the apparatus during the operation of the engine.

Another object of the present invention is to provide such an engine having an improved scheme for sealing the working chambers of the engine from one another.

Still another object of the present invention is to provide such an engine wherein the disposition of its spark plug therein reduces the likelihood of flow communication between working chambers of the engine.

Yet another object of the present invention is to provide such an engine having a rotor body within which the engine spark plug is mounted and an attending arrangement for energizing the spark plug.

A further object of the present invention is to provide such an engine having a new and improved scheme for control of the utilization of the working chambers of the engine.

A still further object of the present invention is to provide such an engine whose working chambers can be selectively activated or de-activated and an associated controller to effect this purpose.

A yet still further object of the present invention to provide such an engine which is adaptable to selective chamber operation whereby only a selected number of working chambers are permitted to operate in response to changing power demands.

One more object of the present invention is to provide such an engine which is uncomplicated in structure, yet effective in operation.

SUMMARY OF THE INVENTION

This invention resides in a guided-vane rotary internal combustion engine including a housing including a body having an interior opening, a rotor assembly which is mounted within the housing opening for rotation therein about an axis, and a plurality of radially-extending vane assemblies arranged about the rotor assembly for movement radially inwardly or outwardly with respect to the rotation axis in conjunction with the rotation of the rotor assembly within the opening of the housing body and wherein the vane assemblies separate the interior opening of the housing into a plurality of working chambers within which an air/fuel mixture can be introduced during an intake cycle, compressed during a compression cycle, ignited during a combustion phase, or period, expanded during an expansion cycle and exhausted during an exhaust cycle during each revolution of the rotor assembly.

In one embodiment of the invention, the improvement is characterized in that the rotor assembly includes a plurality of sectors wherein each sector is disposed between adjacent pairs of vane assemblies arranged about the rotor assembly and each sector includes a body having a radially-outwardly facing outer surface, and the engine includes a plurality of spark plugs wherein each spark plug is mounted within the radially outwardly-facing surface of a corresponding sector for igniting an air/fuel mixture contained within the corresponding working chamber. In addition, means are connected to the spark plugs for energizing the spark plugs.

In another embodiment of the invention, the means for energizing includes a high voltage feed-through member which is mounted in a stationary relationship with respect to the housing body and through which an energizing charge for energizing the spark plug is transmitted, and the engine includes a rotor disk which rotates about the rotation axis with the rotor assembly and includes a side face. The means for energizing further includes a plurality of ignition wires having portions which are arranged along the side face of the rotor disk for delivering an energizing charge to the spark plug and which are disposed in such a relationship to the high voltage feed-through so that as the disk rotates with the rotor assembly, energizing charges are transmitted by way of the high voltage feed-through to the ignition wires for energizing the spark plug.

In a further embodiment of the invention, the engine includes means for selectively activating or de-activating the working chambers of the engine upon the occurrence of a predetermined event so that the engine continues to operate with either all or less than all of the working chambers being activated.

BRIEF DESCRIPTION OF THE DRAWINGS

FIG. 5 is a view which illustrates schematically a longitudinal cross section of the FIG. 1 engine wherein the cross section is taken about along line 5-5 of FIG. 1.

DETAILED DESCRIPTION OF AN ILLUSTRATIVE EMBODIMENT

Figure 1:
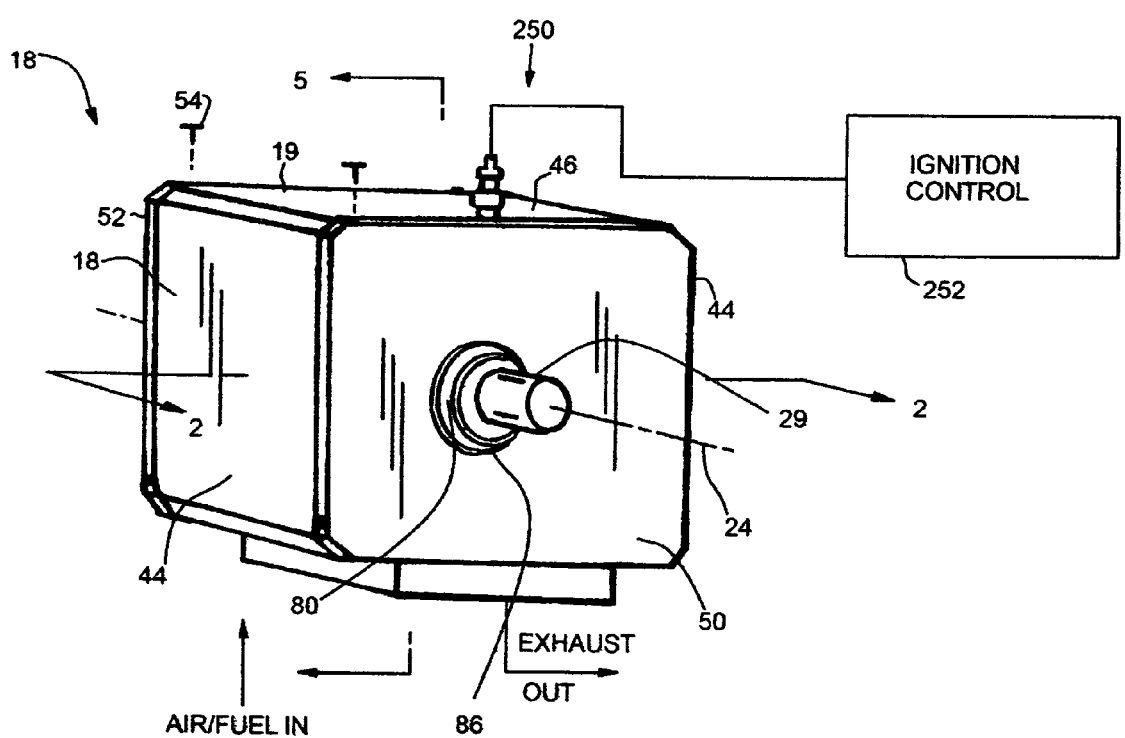
FIG. 1 is a perspective view of an internal combustion engine within which features of the present invention are embodied.
Figure 2:
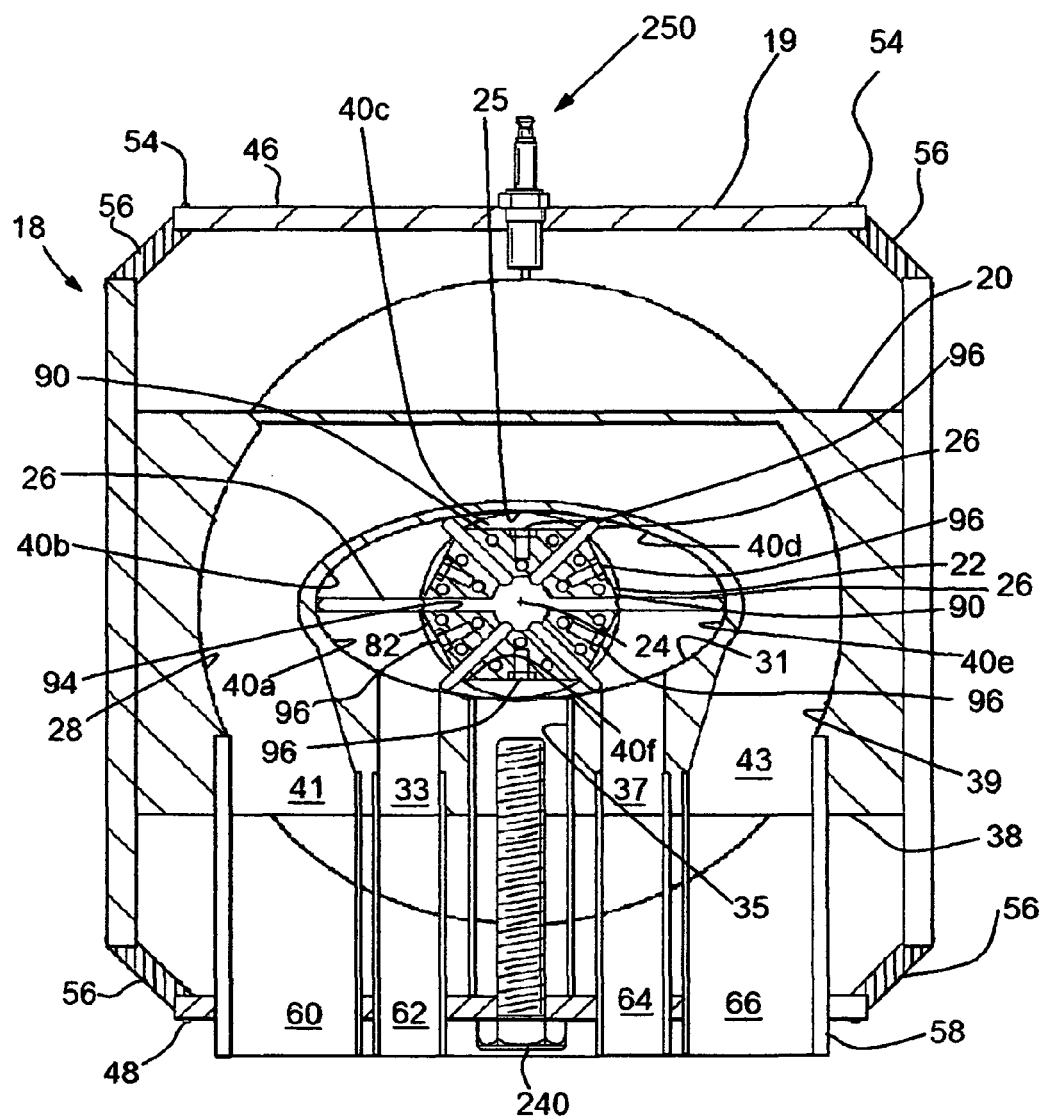
FIG. 2 is a cross-sectional view taken about along line 2-2 of FIG. 1.

Turning now to the drawings in greater detail, there is shown in FIGS. 1 and 2 an internal combustion engine, generally indicated 18, within which features of the present invention are embodied. The engine 18 is a guided vane-type rotary apparatus including means providing an outer housing 19, a housing block 20 mounted within the outer housing 19, means providing a rotor, or rotor assembly, 22 mounted within the housing block 20 for rotation about an axis 24, a plurality of vanes, or vane assemblies, 26 which, with the rotor 22 and housing block 20, divide the interior, indicated 28, of the housing block 20 into a plurality of working chambers 40a-40f. In the depicted engine 18, the vane assemblies 26 are slidably mounted within the rotor 22 for sliding movement relative thereto and toward and away from the axis 24 in conjunction with the rotation of the rotor 22 within the housing 20.

As will be apparent herein, the engine 18 includes a plurality of spark plugs 96 for igniting an air/fuel mixture directed into the working chambers of the engine 18, and these spark plugs 96 are advantageously mounted within the rotor 22 of the engine 18, rather than within the housing block 20. Moreover, the engine 18 includes an arrangement, generally indicated 250 in FIGS. 1 and 2, of conductors through which an energizing charge is transmitted from an ignition controller 252 (FIG. 1) for purposes of energizing, or firing, the spark plugs 96. Furthermore, the engine 18 includes a control unit, generally indicated 300 in FIG. 13, for controlling the operation of the engine 18 through the selective activation or de-activation of the working chambers of the engine 18. Such a control unit 300 is advantageous in that it permits, when desired, engine fuel to be conserved and engine exhaust to be reduced, for example, when power output demands of the engine 18 are reduced.

Figure 3:
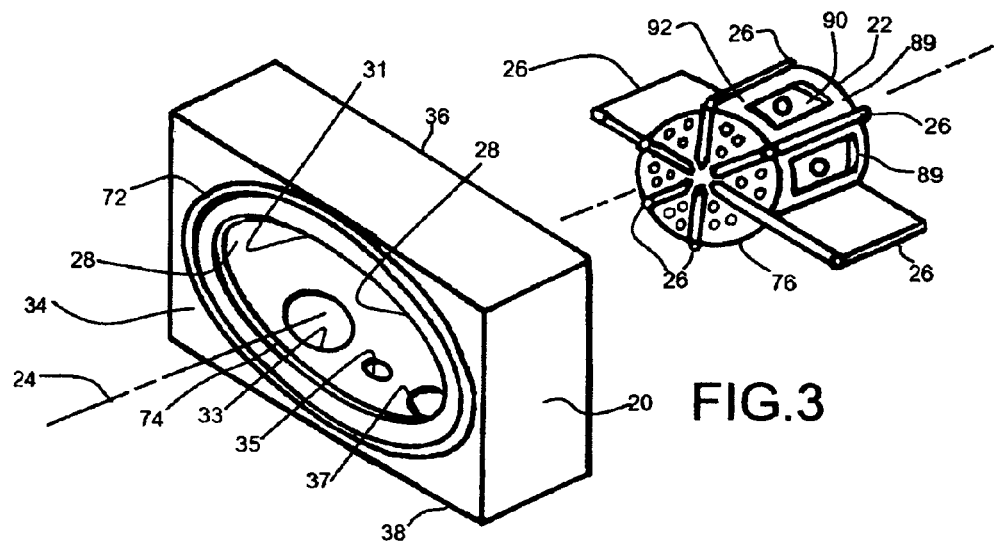
FIG. 3 is a perspective view of the housing block, rotor sectors and vanes of the FIG. 1 engine, shown exploded.
Figures 6, 7:
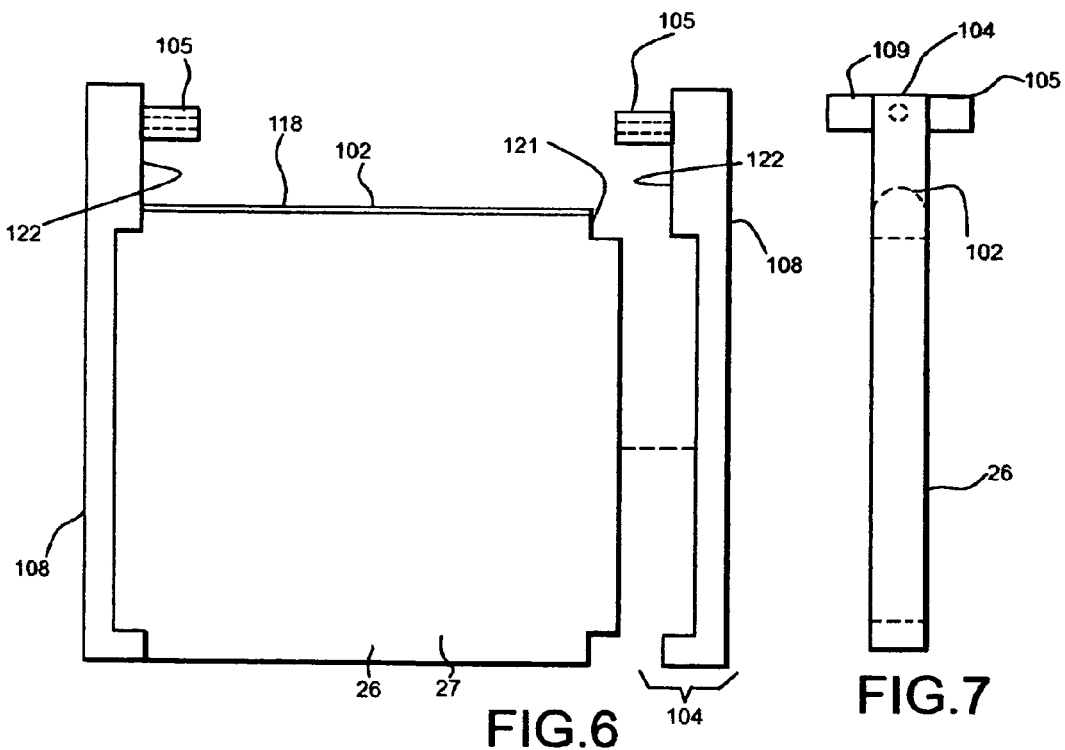
FIG. 6 is a front elevation view of an exemplary vane and pair of linkage assemblies of the FIG. 1 engine, shown exploded.
FIG. 7 is a side elevation view of the FIG. 6 vane and linkage assembly, as viewed from the right in FIG. 6.

As best shown in FIGS. 2 and 3, the housing block 20 of the depicted engine 18 has an outer shape which resembles a rectangular prism and has an inner opening 31 of substantially elliptical cross-section which extends between opposite side faces, indicated 34 and 36, of the block 20. In addition, there are provided passageways 33, 35 and 37 which extend between the bottom surface, indicated 38 in FIG. 2, and the opening 31 which provide, respectively, an air/fuel inlet passageway, a spark plug access opening, and an exhaust passageway. In addition, a hollow inner cavity 39 is provided in the housing block 20 so as to substantially encircle the opening 31 and coolant passageways 41, 43 which extend between the bottom surface 38 and the cavity 39 to permit coolant to be circulated through the cavity 39.

With reference again to FIGS. 1 and 2, the outer housing 19 includes a plurality of end plates 44, a top plate 46, a bottom plate 48 and sidewall plates 50, 52 which are fixedly connected to the end surfaces of the housing block 20 and to one another by way of screws 54 (FIG. 1) and corner members 56 (best shown in FIG. 2) so that when assembled, the outer housing 19 substantially encloses the housing block 20. In addition, a manifold assembly 58 is securely joined to the bottom plate 48 of the outer housing 19 and embodies ports 60, 62, 64 and 66 which are joined in flow communication, respectively, with the coolant passageway 41, the air/fuel inlet passageway 33, the exhaust passageway 37 and the coolant passageway 43 of the housing block 20.

Figure 4:
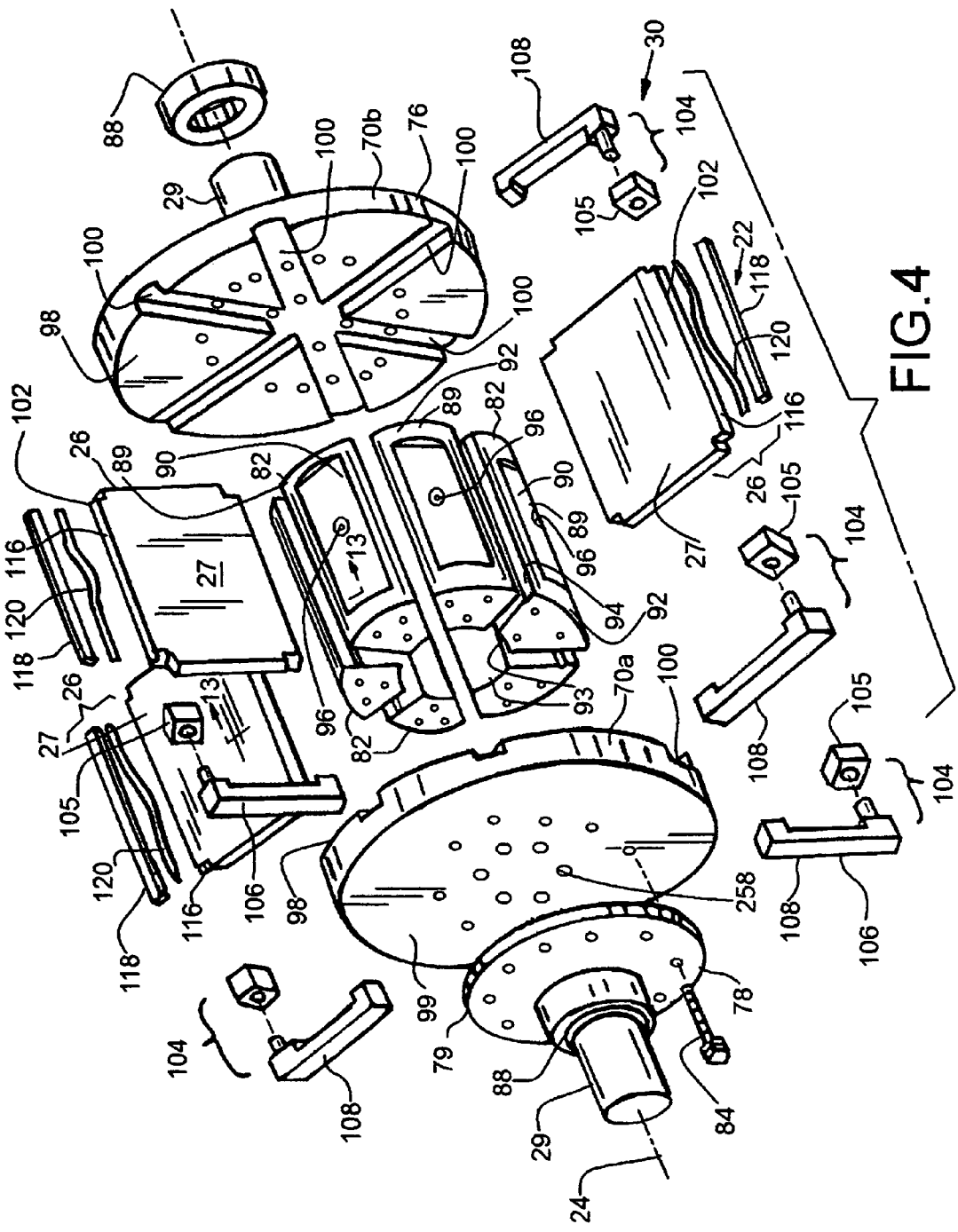
FIG. 4 is a perspective view of various components of the FIG. 1 engine, shown exploded.

With reference to FIGS. 3 and 4, the interior 28 of the housing 20 accepts the rotor 22 directed endwise therein and is enclosed at the side faces 34, 36 thereof by way of a pair of rotor discs 70a, 70b positioned adjacent the side faces 34, 36. Meanwhile, the rotor 22, along with the vane assemblies 26, are sandwiched between the rotor discs 70a, 70b. It follows that the walls of the opening 31 provide the sidewalls of the housing interior 28 within which the rotor 22 is positioned. Furthermore, each side face 34 or 36 of the housing block 20 defines a shallow groove 72 of substantially rectangular cross section and a sealing-accepting recess 74 which encircles the mouth of the opening 31. Each of the groove 72 and recess 74 is endless in that each is continuous about the opening 31 and follows a substantially elliptical, i.e. non-circular, path thereabout, and the purposes of the groove 72 and recess 74 will be apparent herein.

During operation of the depicted engine 18 and with reference again to FIG. 2, the rotor 22 is intended to rotate within the housing block 20 in a clockwise direction about the axis 24. This being the case and as the cycles of the internal combustion process of the engine 18 are carried out within the housing interior 28, an air/fuel mixture is permitted to enter the interior 28 by way of the manifold port 62, and the products of combustion are permitted to exit the interior 28 by way of the manifold port 64. Meanwhile, the engine 18 is cooled with coolant routed through the cavity 39 by way of the manifold ports 60 and 66.

Figure 8:
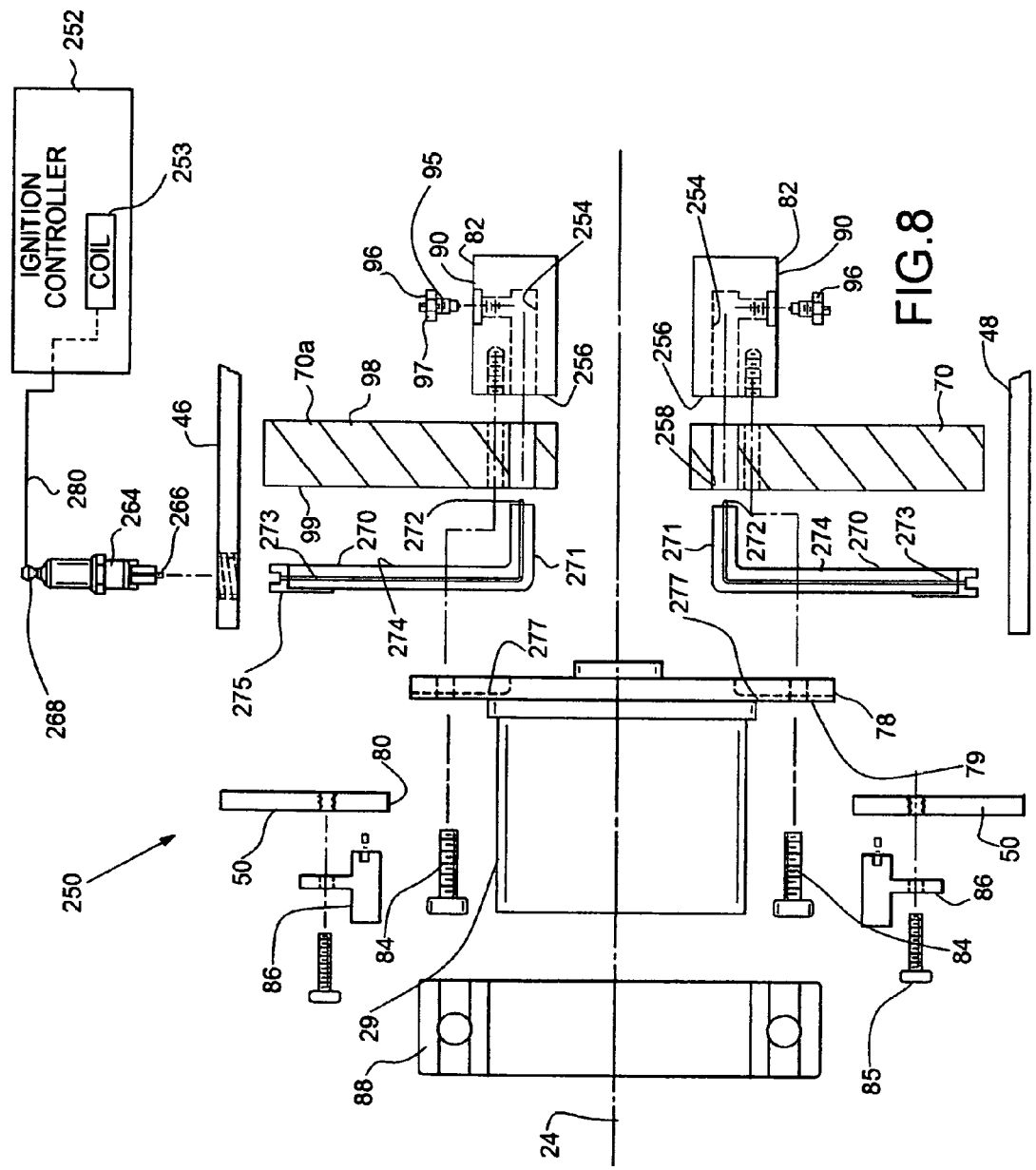
FIG. 8 is a fragmentary cross-sectional view, similar to that of FIG. 5, of some of the engine components depicted in FIG. 5, but shown exploded.
Figure 9:
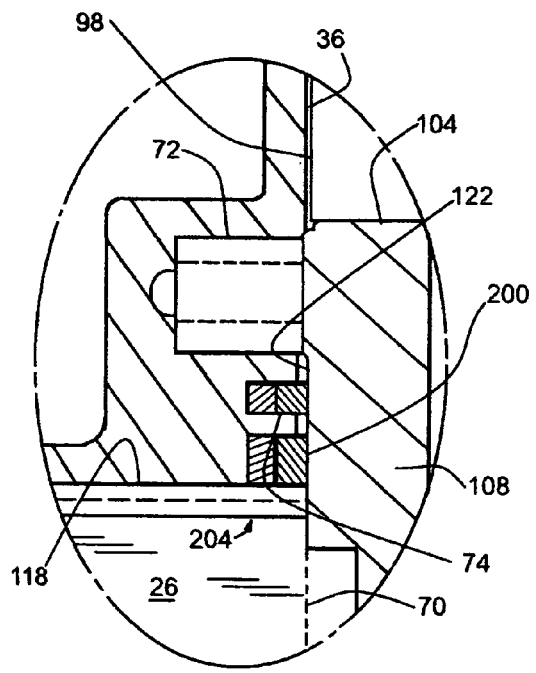
FIG. 9 is a portion of the FIG. 5 view taken about along line 9-9 of FIG. 5, but drawn to a slightly larger scale.
Figure 11:
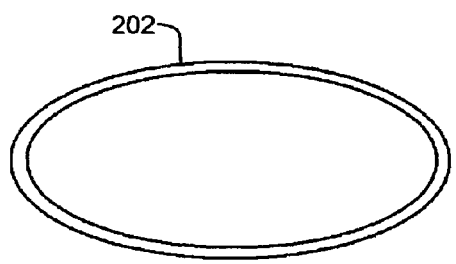
FIG. 11 is an elevation view of the sealing ring depicted in FIGS. 9 and 10, as seen generally from the right in FIGS. 9 and 10.
Figure 10:
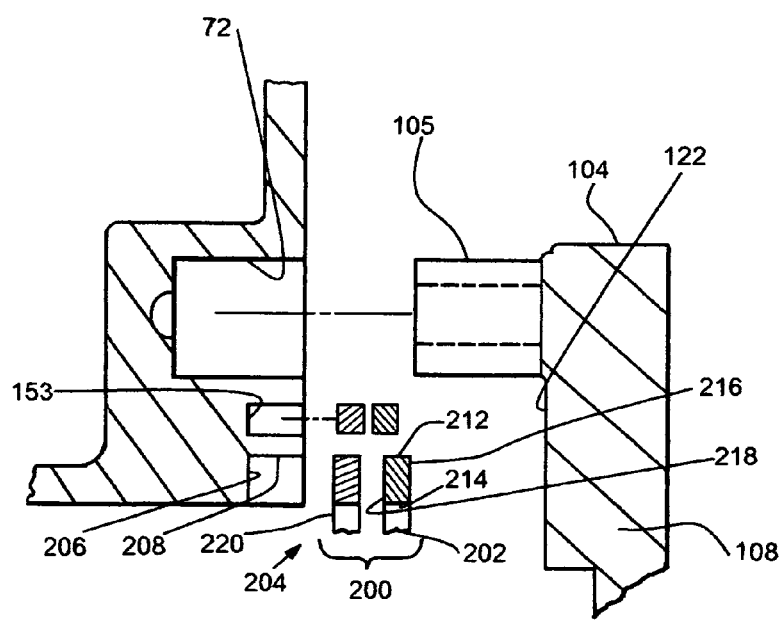
FIG. 10 is a view, similar to that of FIG. 9, of the components of FIG. 9, but shown exploded.

With reference to FIGS. 4, 5 and 8, the rotor 22 includes a somewhat spool-shaped assembly 76 including a pair of shaft-bearing flanges 78 having a shaft 29, a flange portion 79, the pair of circular rotor disks 70a, 70b (introduced earlier), and a plurality of, i.e. six, central hub sectors 82 which are regularly spaced about the axis 24. Each shaft flange 78 and disk 70a or 70b is fixedly joined, as with bolts 84, to a corresponding end of the sectors 82 so that these joined elements must rotate together as a single unit with no relative movement therebetween. When mounted within the housing 20, the center of mass of this unitary rotor assembly 76 is located along the rotation axis 24, and the shafts 29 extend through a central opening 80 (FIG. 1) of the housing sidewall plates 50, 52. When extending through the sidewall plate openings 80 in this manner, the shafts 29 support the rotor 22 for rotation about the axis 24, as well as transmit rotational forces from the rotor 22. An anti-friction bearing, such as a ball bearing 88, is retainably positioned between the surfaces of the shaft 29 and the sidewall plate opening 80 disposed on each side of the engine 18 by way of a flange 86 which is tightly positioned about the bearing 88 and mounted upon a corresponding sidewall 50 or 52 (with bolts 85) to facilitate the rotation of the rotor 22 relative to the housing block 20.

With reference still to FIG. 4, each hub sector 82 is shaped to somewhat resemble a truncated sector of a right circular cylinder having a outwardly-directed surface 89 (comprised of rounded, or arcuate-shaped, edge portions 92 and substantially flat portions 90 disposed centrally of the edge portions 92), and an inwardly-directed surface 93. In addition, each sector 82 is attached at its ends to the rotor disks 70a, 70b (e.g. with bolts 84) so that each sector 82 is maintained in a spaced relationship with its adjacent sector 82. The spacing, indicated 94 in FIGS. 2 and 4, provided between adjacent sectors 82 provides a slot within which a corresponding vane assembly 26 is slidably positioned. The arcuate-shaped portion 92 of the outwardly-directed surface 89 of each sector 82 is shaped to provide a relatively close operating proximity with the walls of the housing interior 28 as the sector 82 passes through various cycles (i.e. compression and exhaust cycles) of the housing interior 28. Furthermore and as will be described in greater detail herein, it is within the substantially flat portion 90 of the outwardly-directed surface 89 of each hub sector 82 that a spark plug 96 is mounted in order to ignite the air/fuel mixture when the hub sector 82 passes through the combustion phase, or period, of the engine cycle.

With reference still to FIG. 4, each rotor disk 70a or 70b includes an interior face 98 which is provided with a series of grooves 100 which extend radially across the disk face 98 from the center thereof. In the depicted embodiment 18, there are six radially-extending grooves 100, and the opening of each groove 100 is aligned with (i.e. in registry with) a corresponding space 94 provided between adjacent sectors 82. During rotation of the rotor 22 within the housing interior 28, these grooves 100 provide guide tracks along which the vane assemblies 26 are guided as each vane assembly 26 is shifted radially of the rotor 22.

With reference to FIGS. 4-7, each vane assembly 26 (only three shown in FIG. 4) includes a vane body 27 which is generally platen-like in shape, is sized to be slidably accepted by a corresponding spacing 94 provided between each pair of adjacent sectors 82, and includes an outwardmost tip edge 102. Also included in each vane assembly 26 is a vane tip seal 118 and a bias spring 120 which are positioned within an elongated groove 116 which extends along the length of the tip edge 102 of the vane body 27. During rotation of the rotor 22 within the housing interior 28, it is the outermost edge of the vane tip seal 118 which acts as the outer edge of the vane assembly 26 and slidably moves in engagement with the walls of the housing opening 31 to maintain an effective seal therebetween.

With reference again to FIG. 2, the vane assemblies 26, in conjunction with the surfaces 89 of the rotor sectors 82, divide the housing interior 28 into six working chambers 40a-40f. Due to the non-circular walls of the interior 28, the chambers vary in volume through a single revolution of the rotor 22 about the axis 24. It will be appreciated that as the rotor 22 is rotated relative to the housing 20 about the axis 24 in a clockwise direction, as viewed in FIG. 2, an air/fuel mixture which enters the housing interior 28 through the intake port 62 (and subsequently becomes trapped within a chamber), is subsequently compressed as the vane assemblies 26 (whose vane tip seal 118 slidably moves along the walls of the housing 28) are rotated by the rotor 22 toward an uppermost (i.e. top dead center) location, indicated 25 in FIG. 2, where combustion occurs. Within the depicted engine 18, the top dead center location 25 corresponds with the location within the housing interior 28 at which each working chamber attains its minimum volume at the end of its compression cycle. As the chambers continue to be rotated along the right side, as viewed in FIG. 2, of the interior 28, the shape of the chambers accommodate the expansion and subsequent exhaust cycles of the engine operation. It follows that the four cycles of operation of the engine 18 (each of which occurs during a single revolution of the rotor 22) include the intake, compression, expansion (power-generating) and exhaust cycles, and these four cycles are repeated, in sequence, as the rotor 22 rotates about the axis 24.

The engine 18 also includes means, generally indicated 30 in FIG. 4, for coordinating the radial movement of the vane assemblies 26 with the rotation of the rotor 22 about the axis 24. In this regard, the method by which the vane assemblies 26 are moved radially of the rotor 22 by way of the coordinating means 30 is well known so that a more detailed description is not believed to be necessary. Suffice it to say that the coordinating means 30 of the engine 18 includes a plurality of linkage assemblies 104 interposed between the vane assemblies 26 and the grooves 72 (FIG. 4) provided in the side faces 34, 36 of the housing block, or body, 20, and each linkage assembly 104 (only five shown in FIG. 4) includes a camming, i.e. cam follower, element 105 which is accepted by the groove 72 (FIGS. 3 and 5) provided in a side face 34 or 36 of the housing block 20 for sliding movement therealong. With the camming elements 105 positioned, and thereby captured, within the groove 72 in this manner, rotation of the rotor 22 about the axis 24 effects the forced shift of vane assemblies 26 radially of the rotor 22.

For a more complete description of the coordinating means 30 with which the radial movement of the vane assemblies 26 is coordinated with the rotation of the rotor 22 about the axis 24, reference can be had to the earlier-referenced U.S. Pat. No. 5,634,783, the disclosure of which is incorporated herein by reference.

It follows that as the rotor 22 is rotated about the axis 24, the vane assemblies 26, which are captured within the rotor spaces 94 and the disk grooves 100 must rotate about the axis 24 as well. Because the slidable cam follower elements 105 of the linkage assemblies 104 are captured within the elliptical cam grooves 72 for sliding movement therealong and must consequently shift toward and away from the axis 24 during a single revolution of the rotor 22 about the axis 24 in accordance with the shape of the elliptical path of the groove 72, the vanes 26 must shift toward and away from the rotation axis 24 during a single revolution of the rotor 22 about the axis 24. It also follows the vane tip seals 118 of the vane assemblies 26 are maintained in engagement with the walls of the housing interior 28 as the linkage assemblies 104 maintain a fixed spacing between the outermost edges of the vane tip seals 118 and the grooves 72. Moreover, the vane body 27 of each vane assembly 26 is sized so that when shifted to its radially outwardmost position during a revolution of the rotor 22, a portion of each vane body 27 remains captured within the rotor spacing 94.

With reference to FIGS. 5 and 9-11, the seal-accepting recess 74 provided in the housing block 20 accepts a seal assembly 200 intended to reduce the likelihood of flow communication between adjacent working chambers of the housing interior 28 and between the working chambers and the running clearance formed between the housing interior 28 and the disk face 98. In this connection, the seal assembly 200 (best shown in FIGS. 9 and 10) includes an elliptically-shaped sealing ring 202 which is positioned within the recess 74 and biasing means, generally indicated 204, for urging the sealing ring 202 outwardly of the recess 74 and against the interior face 98 of the adjacent rotor disk 70a or 70b wherein the disk face 98 is co-planar with the inner surface, indicated 122, of the bar portion 108 of the linkage assembly 104. Within the depicted engine 18, the biasing means 204 is in the form of a wave spring 220 which is disposed between the bottom surface 206 of the recess 74 and the rear face 218 of the sealing ring 202.

Further still and as mentioned earlier and with reference to FIGS. 2, 4 and 8, a spark plug 96 is mounted within the substantially flat portion 90 of the outwardly-directed surface 89 of each of the six hub sectors 82 of the rotor 22 so that each working chamber of the housing interior 28 is provided with a spark plug 96 for purposes of igniting the air/fuel mixture contained within the working chamber as the chamber passes near the top dead center location 25 (FIG. 2) of the engine 18. As used herein, the top dead center location 25 can be further defined as the point along the minor axis of the elliptically-shaped inner opening 31 of the engine 18 at which the volume of each working chamber attains its minimum size as each working chamber transitions from its compression cycle to its expansion cycle.

By mounting the spark plugs 96 within the rotor hub sectors 82, rather than within the (outer) wall of the housing interior 28, there is no disruption of the outer wall of the housing interior 28 to accommodate the mounting of a spark plug therein and thereby greatly improves the sealing of the working chambers at the outer edges of the vane tip seals 118. This also provides a more desirable location for the spark for igniting the air/fuel mixture as the spark location is moved more toward the center of the combustion chamber volume and away from the quenching surfaces of the outer wall of the housing interior 28.

Briefly and as best shown in FIG. 8, each spark plug 96 has a hex-shaped head 97, and a body 95 which is externally-threaded for threaded acceptance by an internally-threaded opening disposed substantially centrally of the flat surface portion 90 of the corresponding sector 82. Each spark plug 96 has two electrodes, i.e. a high voltage and a ground, which extend from its exterior outwardly-directed hex face into the working chamber for ignition of the air/fuel mixture contained therein. Furthermore, the spark plug body 95 has a central opening suitable for a high voltage and is constructed of high temperature-rated materials. The high voltage electrode is fixed within the center of a centrally-mounted insulator material of the plug 96, while the high voltage electrode extends inwardly of a corresponding hub sector 82 and toward the rotational axis 24 where it makes electrical contact with the end 272 of an ignition wire 270 which, in turn, is coated with a high voltage-rated insulation. The space around and near the regions of each hub sector 82 (and disposed within the interior of the hub sector 82) contacted by the high voltage electrode of the plug 96 is fitted with a high dielectric material to prevent high voltage arc-over to the body of the hub sector 82.

Access to each spark plug 96, for the purpose of removal or replacement, can be had by way of the access passageway 35, best shown in FIG. 2. In this connection, a threaded plug 240 (FIG. 2) is threadably removed from the entrance of, to thereby open, the passageway 35, and the rotor 22 is rotated about the axis 24, as necessary, to position the spark plug 96 (i.e. the one desired to be removed or replaced) in vertical registry with the passageway 35 (FIG. 2). With the desired spark plug 96 positioned in vertical registry with the passageway 35 in this manner, the spark plug 96 can be removed with an appropriate tool directed through the passageway 35.

During the course of engine operation (and during which full power output of the engine 18 is desired), the spark plugs 96 are energized in a desired sequence and, for example, when each working chamber of the engine 18 approaches near the top dead center location 25 (e.g. during the compression cycle of a working chamber). In other words, each spark plug 96 is intended to ignite the air/fuel mixture contained within the corresponding chamber as the chamber approaches the uppermost, or top dead center location 25, as viewed in FIG. 2, of the housing interior 28. As will be apparent herein, it is a feature of the present invention that the engine 18 includes an arrangement, generally indicated 250, of conductors (introduced earlier) which extends between each spark plug 96 and an ignition controller 252 (FIGS. 1 and 8) for communicating a high voltage ignition charge from an external ignition coil 253 to each spark plug 96 in a sequential fashion and in a desired timing pattern as the rotor 22 rotates during engine operation.

In connection with the foregoing and with reference to FIG. 8, there is provided within each rotor sector 82 an access passageway 254 which extends substantially axially of the body of the sector 82 from the terminal end of the spark plug 96 and opens out of one side face, indicated 256, of the sector 82, and there is provided within the disk 70a (disposed adjacent the sector side face 256) a plurality of openings 258 (FIG. 8) which are each aligned with a corresponding passage 254 opening out of the sector side faces 256. In addition, the disk 70a defines an exterior face, indicated 99 in FIG. 8, situated on the side of the disk 70a opposite the sector side faces 256. Furthermore, a high voltage feed-through member 264 having an electrode, or electrode tip, 266 and an opposite terminal 268 is fixedly positioned (i.e. threaded) within the top plate 46 of the depicted outer engine housing 19 so that the electrode tip 266 extends into the interior of the outer housing 19.

It will be understood that within the depicted engine 18, each spark plug 96 (six in total) mounted within the engine rotor 22 rotates together with the hub sectors 82 and the disk 70. On the other hand, the engine 18 includes only one high voltage feed through member 264 whose electrode tip 266 remains in a stationary position within the outer housing 19. Moreover, the high voltage electrode 266 of the high voltage feed through member 264, which (within the depicted engine 18) is fixedly mounted upon the engine top plate 46, is mounted centrally of the body of the member 264 and extends inwardly of the engine 18 for a reason which will be apparent herein.

Figure 12:
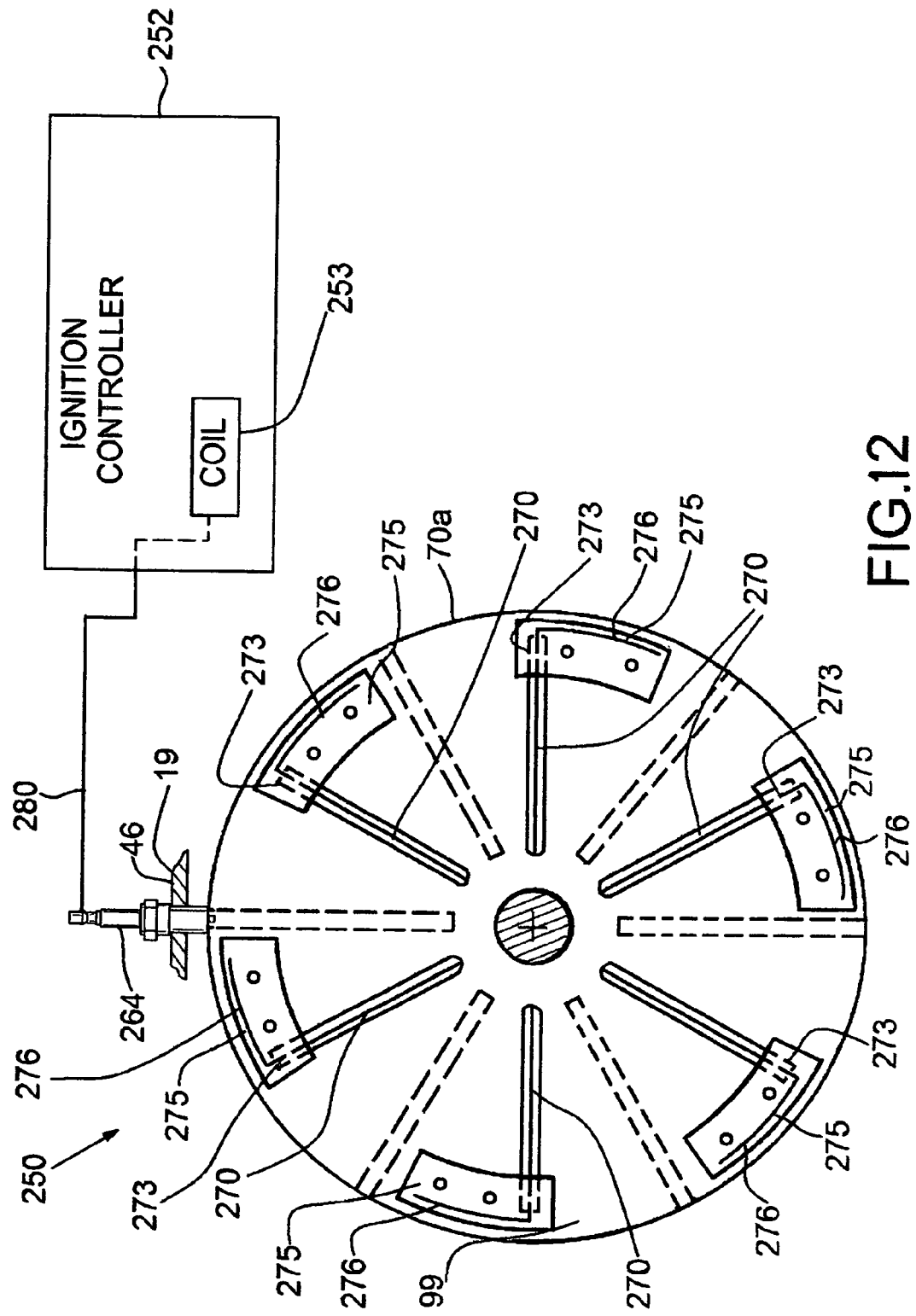
FIG. 12 is a fragmentary cross-sectional view taken about along lines 12-12 of FIG. 5 depicting the relationship between one rotor disk and the high voltage feed-through member of the FIG. 1 engine.

With reference to FIGS. 8 and 12, the conductor arrangement 250 includes a series of (i.e. six) elongated and insulated ignition wires 270 wherein each wire member 270 has a portion 271 which extends axially along a sector passageway 254 and is connected at its end 272 to the terminal end of the corresponding spark plug 96 and has another portion 274 which is arranged so as to extend radially along the exterior face 99 and has an end 273 which is disposed adjacent the outer periphery of the disk 70a. Inasmuch as the portion 271 of each wire 270 extends substantially axially of the rotor 22 while the portion 274 of each wire 270 extends substantially radially of the disk face 99, wire-accepting grooves 277 are provided within the flange 78 (which is secured in abutting relationship with the disk face 99) for accepting and maintaining a gently curving, right-angle bend of each wire 270 at an elbow.

Furthermore, there is associated with each wire end 273 a contact block 275 which is mounted against the disk face 99 adjacent the periphery thereof. Each contact block 275 is constructed of a electrically insulating material, and each contact block 275 supports an arcuately-formed conductive segment 276 situated adjacent and electrically connected to the wire portion end 273 and which extends along an arcuate path across a radially outwardly-directed surface defined by, for example, the bottom of a groove formed along, the corresponding contact block 275 (and at a constant radius from the rotation axis 24) so that as the disk 70a of FIGS. 8 and 12 rotates past the high voltage feed-through member 264 to a rotational position about the axis 24 at which each segment 276 passes the electrode 266 of the feed-through member 264, the spark plug 96 is energized by the ignition controller 252 (by way of the high voltage feed-through member 264) and thereby ignites the air/fuel mixture contained within a working chamber of the engine 18. Preferably, the arcuately-formed conductive segments 276 are regularly-arranged in a spaced relationship around the outer side face 99 of the FIG. 12 disk 70a.

As an alternative to the foregoing, the high voltage feed-through member 264 can be fixedly mounted at an alternative location along the top plate 46 (or other plates of the engine 18) as long as its electrode 266 is capable of making electrical connection to each insulated high voltage ignition wire 270 mounted internally of the engine 18. Thus, placement of the high voltage feed-through member 264 is adaptable in location for the sake of convenience (e.g. for accessibility-related reasons) rather than having to be fixed at any one location along the top plate 46. For example and if desired, an intermediate ignition wire (not shown) can be interposed between the center electrode 266 of the high voltage feed-through member 264 mounted remote of, for example, the top plate 46 and an alternative high voltage member, i.e. an electrode holder (not shown), having an associated electrode fixedly positioned within the interior of the outer housing 19 and arranged so as to align with the top dead center location 25 at which the electrical charge from the high voltage member and associated electrode is transmitted to the ignition wire 270.

The ignition controller 252, including an ignition coil 253, is mounted externally of the engine 18, and its high voltage terminal is electrically connected (by way of an insulated conductor 280) to the terminal 268 of the high voltage feed-through member 264 mounted within the top plate 46. Thus, the controller 252, high voltage feed-through member 264, and conductor wires 270 act as a rotating high voltage ignition distributor for the engine 18. If desired, a magneto-type coil (of known construction) can be used in place of the ignition coil 253.

The aforedescribed arrangement of the conductive segments 276 along the disk outer side face 99 is advantageous in that it permits the timing of the spark plug firings to be altered with respect to the rotational position of the working chambers of the housing interior 28 in relation to the uppermost, or top dead center, location 25 (FIG. 2). In other words, if it is desired to fire each spark plug 96 at a preselected position relative to the top dead center location 25 (e.g. in advance of the position at which each spark plug 96 is disposed at the top dead center location 25), the ignition controller 252 can be pre-set, or pre-programmed, to transmit a high voltage charge from the feed-through member 264 to each conductive segment 276 at a preselected location therealong as each segment 276 passes beneath the electrode tip 266 during rotation of the rotor 22 about the axis 24. Thus, the aforedescribed conductor arrangement 250 facilitates an adjustment in the timing of the spark plug firings and is advantageous in this respect.

For a detailed discussion of additional features, such those which relate to sealing, lubricating and cooling features, of an engine which are adaptable to the depicted engine 18, reference can be had to my earlier U.S. Pat. No. 5,634,783, the disclosure of which is incorporated herein by reference.

It follows from the foregoing that the aforedescribed mounting of the spark plugs 96 within the rotor 22, rather than within the housing block 20, is advantageous in that it positions each spark plug in a region of the working chamber adjacent the outwardly-facing surface 89 of the corresponding rotor sector 82. These rotor-mounted plugs 96 obviate any disruption of the wall of the housing opening 31 (which would otherwise be required if the plugs were mounted along the wall of the housing opening 31) and thereby greatly improves upon the sealing capacity of the vane tip seal 118 as the vane tip seal 118 moves along the wall of the housing opening 31. This also provides a more desirable location for the spark to ignite the air/fuel mixture, since the spark location is moved more toward the center of the combustion chamber volume, and away from the quenching surfaces of the chamber walls.

It also follows that the aforedescribed conductor arrangement 250 of the engine 18 provides a suitable ignition system for delivering, when desired, energizing charges to the spark plugs 96 for igniting the air/fuel mixture confined within the working chambers of the engine 18. In this connection, the rotor 70a operates as a rotating ignition distributor for communicating external ignition coil high voltage energy through the high voltage feed-through 264, into the engine 18, arc across a small air gap to a contact block 275, to an ignition wire 270, to a spark plug 96 mounted in a hub sector 82 for ignition of the air/fuel mixture confined within a corresponding working chamber of the engine 18.

Figure 13:
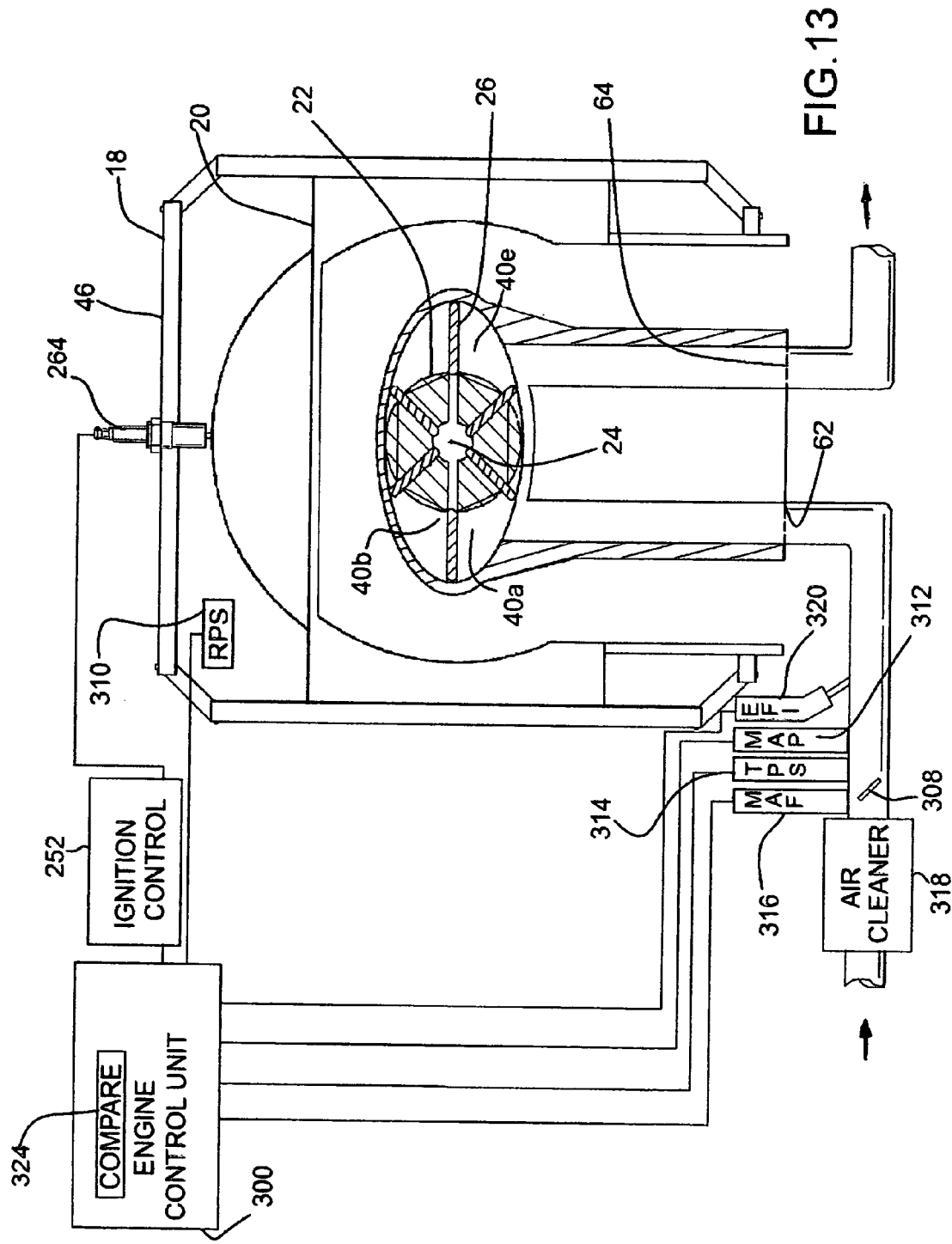
FIG. 13 is a schematic cross-sectional view of the FIG. 1 engine which illustrates in block diagram form the interconnection between various components of the engine.

With reference to FIG. 13, it is also a feature of the engine 18 that the engine control unit 300 is adapted to selectively activate or de-activate working chambers of the engine upon the occurrence of a predetermined event so that the engine 18 continues to operate with either all or less than all of the working chambers undergoing combustion (or firing) during revolutions of the rotor 22 about the rotation axis 24. Such a feature is advantageous in that it permits the power output of the engine 18 to be altered in the event that loads upon the engine 18 are altered. For example, in instances in which full power output is not always needed at all times, one or more of the working chambers can be de-activated by the control unit 300 to thereby conserve fuel and reduce exhaust emissions.

In the interests of the present invention, a working chamber of the engine 18 is activated when the chamber is utilized for generating engine power. More specifically and within the engine 18, a chamber is activated when an air/fuel mixture is delivered to the working chamber during its intake cycle and subsequently ignited, or fired, just prior to the expansion (or power) cycle or during the combustion phase of a revolution of the rotor 22 for the production of power. By comparison, a working chamber is de-activated when it is not used to contribute to the engine power output. In other words, a working chamber is de-activated when steps are taken by the control means 300 to prevent that working chamber from contributing to the engine power output. Within the depicted engine 18 and as will be apparent herein, such de-activation steps include the prevention of an introduction of fuel (or an air/fuel mixture) into the working chamber during the intake cycle and the attending prevention of the firing of the spark plug 96 associated with the working chamber desired to be de-activated.

In connection with the foregoing, there is illustrated in FIG. 13 a schematic cross-sectional view of the engine 18 which depicts, in block diagram form, exemplary componentry which can be used in conjunction with the engine control unit 300 for controlling the activation and de-activation of the working chambers of the engine 18. Furthermore, the engine control unit 300 includes an electrically-operated microcomputer which has been pre-programmed with information relating to the desired operating characteristics of the engine under pre-selected conditions. For example, the microcomputer can be pre-programmed with information which relates to one or more threshold characteristics of engine operation indicative of a condition (or conditions) at which the output power of the engine 18 can be reduced (e.g. from the total number of working chambers of the engine 18) through the de-activation of at least one working chamber or indicative of a condition (or conditions) at which the output power of the engine should be advantageously increased (i.e. from a number of working chambers which is fewer than the total number of working chambers) through the activation of at least one additional working chamber of the engine 18.

Meanwhile, there is provided a passageway 306 through which a air/fuel mixture is conducted to the intake manifold port 62 (FIG. 1) for acceptance by each working chamber of the engine 18 which is in flow communication with the interior of the passageway 306 as the working chamber passes through its intake cycle of rotor revolution, and a throttle plate 308 is movably mounted within the passageway 306 for movement between alternative positions within the passageway 306 for controlling the flow of air therethrough. Moreover, the engine 18 also includes an assortment of sensors (described herein) used to supply input (i.e. feedback information) to the control unit 300 for purposes of determining whether, for example, an earlier-mentioned threshold characteristic of engine operation is achieved.

For example, the engine 18 can include a rotor position sensor 310 mounted adjacent the rotor 22 for monitoring (through known techniques) the real-time position of the rotor 22 about the axis 24. This monitored information can be used by the control unit 300 to, for example, adjust the engine timing for fuel and ignition or to determine the rotational speed of the engine output shaft 29. When the speed of the output shaft 29 is increased, the number of active chambers could be reduced to thereby reduce the speed of the output shaft 29. Conversely, when the speed of the output shaft 29 is decreased, the number of active chambers could be increased to thereby increase the speed of the output shaft 29.

The engine 18 can also include a manifold pressure sensor 312 mounted adjacent the passageway 306 for monitoring the pressure of the intake stream disposed downstream of the throttle plate 308 which is, in turn, indicative of engine load. As the manifold pressure is increased, the number of active chambers can be advantageously increased, and as the manifold pressure is decreased, the number of active chambers can be advantageously decreased.

In addition, a throttle position sensor 314 can be mounted adjacent the passageway 306 and connected to the throttle plate 308 for monitoring the position of the throttle plate 308 (between, for example, fully opened and fully closed conditions) and is indicative of the demands of a user of the engine 18. As the position of the throttle plate 308 is altered to accelerate the engine 18, the number of active chambers of the engine 18 can, for example, be increased, and as the position of the throttle plate 308 is altered to decelerate the engine 18, the number of active chambers of the engine 18 can, for example, be decreased.

Furthermore, a mass air flow sensor 316 can be mounted within the passageway 306 (and disposed between an air cleaner 318 and the throttle plate 308) for monitoring the rate of the air flow conducted through the passageway 306 and toward the chambers. If the mass air flow sensor 316 detects an increase in the rate of the air flow moving through the passageway 306, the number of active chambers can, for example, be advantageously increased, and if the mass air flow sensor 316 detects a decrease in the rate of air flow moving through the passageway 306, the number of active chambers can, for example, be advantageously decreased.

Meanwhile, the engine 18 includes an electronic fuel injector 320 mounted adjacent the passageway 306 (and situated downstream of the throttle plate 308) for injecting, upon demand, fuel into the air moving through the passageway 306. The fuel injector 320 is connected to the control unit 300 for receiving operating commands therefrom. In other words, once the control unit 300 (by way of its microcontroller) determines how many and which ones of the working chambers are to be advantageously activated (while others are de-activated), then appropriate command signals are sent to the fuel injector 320 so that only the activated chambers are fueled during the intake cycle of the chambers to be activated. Therefore and from a functional standpoint, the control unit 300 prevents fueling of any chamber desired to be de-activated.

With reference still to FIG. 13, the ignition controller 252 is appropriately wired to the control unit 300 for receiving commands therefrom which relate to the firing of the activated chambers. In other words, once the control unit 300 (by way of its microcontroller) determines how many and which ones of the working chambers are to be advantageously activated (while others are de-activated), then appropriate command signals are sent to the ignition controller 252 so that only the activated chambers are fired during the combustion phase of the chambers to be activated. Therefore and from a functional standpoint, the control unit 300 prevents ignition of any spark plug 96 associated with a de-activated working chamber.

It will be understood that the above-mentioned sensors 310, 312, 314 and 316 are examples of sensors which can be utilized within the engine 18 for supplying information to the control unit 300 indicative of the real-time operating characteristics of the engine 18. Upon receiving the monitored information from the sensors, the control unit 300 can determine whether more, less, or the same number of working chambers should be utilized, and based upon that determination, control the activation or de-activation of the chambers by way of the fuel injector 320 and the ignition control 252. For example, upon receiving input from the sensors 310, 312, 314 or 316 indicative of a corresponding operating characteristic of the engine, that input is compared, by way of a comparison circuit 324 to a corresponding threshold characteristic (pre-programmed into the microcontroller) to determine whether or not the number of activated working chambers should be altered. Upon determining that any (or additional) chambers should be de-activated, then appropriate commands are delivered to both the fuel injector 320 to shut off the introduction of fuel to the working chamber (or chambers) desired to be de-activated and to the ignition control unit 252 to prevent the subsequent firing of any spark plug associated with the working chamber (or chambers) desired to be de-activated. It also follows that the control unit 300 coordinates the introduction of fuel to an activated chamber with the firing (by way of the ignition controller 252) of that activated chamber so that only the activated chambers receive fuel and are ultimately fired during the same revolution of the rotor 22.

It also follows from the foregoing that an engine 18 has been described which is capable of operating in a selective displacement mode whereby individual chambers are provided fuel and ignition (for combustion and power output) on an as-needed basis for providing adequate power required by the engine load. Thus, control over the activation or de-activation of the working chambers is had through the control over the fuel introduced to and subsequent ignition of those chambers. Operating characteristics of the engine 18 (which characteristics can relate to load and/or engine rpm) are monitored, and information relating to those monitored characteristics are used to determine which and whether some of the working chambers can be de-activated or which and whether additional working chambers should be activated. Furthermore, the control unit 300 can determine which of the working chambers should be selectively activated or de-activated for providing a balanced firing of the activated chambers for the purpose of advantageous balancing of the engine 18. In addition, the control unit 300 can employ algorithms to predict or determine the active chamber selection based upon past and current operating performance.

It will be understood that numerous modifications and substitutions can be had to the aforedescribed embodiment 18 without departing from the spirit of the invention. For example, there exists several factors pertaining to the present invention that can be manipulated according to the specific functional objectives to be met, and these factors will greatly influence the operating characteristics and suitability of the engine to a particular purpose. Such factors include housing cavity shape, number of vanes or chambers, and placement, size, shape and number of inlet and outlet port openings. Thus, it will be appreciated that the spirit, scope, and fundamental structure of the invention will not be diminished due to the choice of these and other factors for a particular use. Accordingly, the embodiment 18 is intended for the purpose of illustration and not as limitation.

The invention claimed is:

1. In a guided-vane rotary internal combustion engine including a housing including a body having an interior opening, a rotor assembly which is mounted within the housing opening for rotation therein about an axis of rotation, and a plurality of vane assemblies arranged about the rotor assembly for movement radially inwardly or outwardly with respect to the rotation axis in conjunction with the rotation of the rotor assembly within the opening of the housing body and wherein the vane assemblies separate the interior opening of the housing into a plurality of working chambers within which an air/fuel mixture can be introduced during an intake cycle, compressed during a compression cycle, ignited during a combustion phase, expanded during an expansion cycle and exhausted during an exhaust cycle during each revolution of the rotor assembly, the improvement characterized in that:

the rotor assembly includes a plurality of sectors wherein each sector is disposed between adjacent pairs of vane assemblies arranged about the rotor assembly and each sector includes a body having a radially-outwardly facing outer surface so that each sector and the radially-outwardly facing outer surface thereof rotates with the remainder of the rotor assembly and relative to the housing body about the rotation axis, and a plurality of spark plugs wherein each spark plug is mounted within the radially outwardly-facing surface of a corresponding sector of the rotor assembly for rotation with the corresponding sector within the interior opening of the housing body and for igniting the air/fuel mixture introduced within the corresponding working chamber of the plurality of working chambers; and means connected to the spark plugs for energizing the spark plugs as the spark plugs are rotated with the rotor assembly about the rotation axis;

wherein the body of each sector includes an opening which opens out of the radially-outwardly facing surface thereof, and each spark plug has a body which is securely accepted by the opening of a corresponding sector body and wherein the body of each sector includes a passageway which extends substantially axially of the sector body and which communicates with the spark plug-accepting opening of the sector body, and the means for energizing the spark plugs includes an ignition wire having a conducting portion which is arranged within the axially-extending passageway for delivering an energizing charge to the spark plug which is securely accepted by the spark plug-accepting opening of the corresponding sector body, and wherein there is associated with the rotor assembly a disk disposed outboard of the housing opening and adapted to rotate with the rotor assembly about the rotation axis, and the means for energizing the spark plugs includes a plurality of ignition wires wherein each ignition wire includes the conducting portion which is arranged within the axially-extending passageway of a corresponding sector body and another portion which extends substantially radially along the disk with respect to the rotation axis; and the means for energizing includes a high voltage member mounted in a stationary relationship with respect to the housing body and having an associated electrode through which energizing charges for energizing the spark plugs are conducted, and so that as the disk rotates with the rotor assembly about the rotation axis, the energizing charges are delivered to the spark plugs by way of the electrode associated with the high voltage member and the ignition wires.

2. The engine as defined in claim 1 further comprising a plurality of contact blocks which are mounted upon the disk and wherein each contact block is disposed adjacent the another portion of a corresponding ignition wire and is arranged in such a positional relationship to the electrode associated with the high voltage member mounted in a stationary condition with respect to the housing body so that as the disk is rotated with the rotor assembly, the energizing charges are transmitted from the electrode associated with the high voltage member to the ignition wires.

3. The engine as defined in claim 1 wherein the means connected to the spark plugs for energizing the spark plugs are disposed external of the housing body and are adapted to energize the spark plugs in a preselected sequence.

4. The engine as defined in claim 3 further including one rotor disk which rotates about the rotation axis with the rotor assembly, and the one rotor disk includes a side face, and wherein the means connected to the spark plugs for energizing the spark plugs includes a plurality of ignition wires wherein each ignition wire includes a portion which extends substantially axially through the body of a corresponding sector to the spark plug mounted therein and another portion which extends radially along the side face of the one rotor disk for cooperating with the energizing means for purposes of energizing the spark plugs.

5. The engine as defined in claim 4 wherein the another portions of the ignition wires are regularly arranged along the side face of the one rotor disk, and the means for energizing the spark plugs includes a high voltage member having an associated electrode mounted in a stationary relationship with respect to the housing body and through which an energizing charge is transmitted to the another portions of the ignition wires as said another portions of the ignition wires rotate with the rotor assembly about the rotation axis during engine operation.

6. The engine as defined in claim 5 wherein the connected means includes a plurality of conductive segments wherein each conductive segment is arranged along an arcuate path which extends across the side face of the one rotor disk for transmission of an energizing charge from the electrode associated with the high voltage member to another portion of a corresponding ignition wire at any point along the arcuate path at which the conductive segment passes the electrode associated with the high voltage member mounted in a stationary condition with respect to the housing body as the one rotor disk is rotated about the rotation axis during engine operation.

7. The engine as defined in claim 6 wherein each spark plug has a terminal, and the body of each sector of the rotor assembly includes an interior passageway which extends substantially axially of the sector body for providing access to the terminal of the spark plug mounted within the corresponding sector body, and each ignition wire includes a portion which is positioned within a corresponding interior passageway of the sector body so as to extend substantially axially of the sector body to the terminal of the corresponding spark plug.

8. The engine as defined in claim 7 wherein the engine further comprises a plurality of contact blocks mounted upon the side face of the one rotor disk and regularly arranged thereabout, and each conductive segment is mounted upon a corresponding contact block so as to extend in an arcuate path along the contact block and is electrically connected to said another portion of a corresponding ignition wire.

9. The engine as defined in claim 1 further comprising means for selectively activating or de-activating the operation of a working chamber of the plurality of working chambers of the engine upon the occurrence of a predetermined event.

10. The engine as defined in claim 9 wherein the means for selectively activating or de-activating includes means for selectively permitting or shutting off the flow of fuel to the working chambers.

11. In a guided-vane rotary internal combustion engine including a housing including a body having an interior opening, a rotor assembly which is mounted within the housing opening for rotation therein about an axis of rotation, and a plurality of vane assemblies arranged about the rotor assembly for movement radially inwardly or outwardly with respect to the rotation axis in conjunction with the rotation of the rotor assembly within the opening of the housing body and wherein the vane assemblies separate the interior opening of the housing into a plurality of working chambers within which a combustible mixture can be introduced during an intake cycle, compressed during a compression cycle, ignited during a combustion phase, expanded during an expansion cycle and exhausted during an exhaust cycle during each revolution of the rotor assembly, a spark plug for igniting the combustible mixture within a working chamber of the plurality of working chambers during a combustion phase and means for energizing the spark plug, the improvement characterized in that:

the rotor assembly includes a plurality of sectors wherein each sector is disposed between adjacent pairs of vane assemblies arranged about the rotor assembly and each sector includes a body having a radially-outwardly facing outer surface so that each sector and the radially-outwardly facing outer surface thereof rotates with the remainder of the rotor assembly about the rotation axis; and the spark plug is mounted within the radially outwardly-facing surface of a sector of the rotor assembly for rotation with the corresponding sector within the interior opening of the housing body and for igniting the combustible mixture introduced within the corresponding working chamber of the plurality of working chambers;

the means for energizing includes a high voltage member mounted in a stationary relationship with respect to the housing body and having an associated electrode through which an energizing charge for energizing the spark plug is transmitted;

a rotor disk which rotates about the rotation axis with the rotor assembly and includes a side face;

a plurality of ignition wires having portions which are arranged along the side face of the rotor disk for delivering an energizing charge to the spark plug and which are disposed in such a relationship to the electrode associated with the high voltage member so that as the disk rotates with the rotor assembly about the rotation axis, energizing charges are transmitted by way of the electrode associated with the high voltage member to the ignition wires for energizing the spark plug.

* * * * *